United States Patent [19]

Derenne et al.

[11] Patent Number: 4,983,028

[45] Date of Patent: Jan. 8, 1991

[54] DEVICE FOR FIXING A FRAGILE OBJECT, SUCH AS MIRROR

[75] Inventors: Philippe Derenne, Mougins; Michel Louis, Nice; Jacques Camous, Antibes; Michel Tarreau, Savigny sur Orge, all of France

[73] Assignees: Aeropspatiale Societe Nationale Industrielle; REOSC (SA Recherches et Etudes D'Optique et Sciences), Ecoles, both of France

[21] Appl. No.: 458,317

[22] Filed: Dec. 28, 1989

[30] Foreign Application Priority Data

Dec. 29, 1988 [FR] France ................. 88 17399

[51] Int. Cl.$^5$ ........................................... G02B 7/18
[52] U.S. Cl. .................................. 350/609; 350/631; 248/466
[58] Field of Search ............... 350/607, 609, 611, 631; 248/466, 477, 478

[56] References Cited

U.S. PATENT DOCUMENTS

| | | | |
|---|---|---|---|
| 4,593,878 | 6/1976 | Stewart | 350/631 |
| 4,734,557 | 3/1988 | Alfille et al. | 350/611 |
| 4,906,087 | 3/1990 | Ealey et al. | 350/607 |

FOREIGN PATENT DOCUMENTS

| | | |
|---|---|---|
| 0285555 | 10/1988 | European Pat. Off. . |
| 2345610 | 7/1976 | France . |
| 8605425 | 9/1986 | PCT Int'l Appl. . |

*Primary Examiner*—Bruce Y. Arnold
*Assistant Examiner*—J. P. Ryan
*Attorney, Agent, or Firm*—Pearne, Gordon, McCoy & Granger

[57] ABSTRACT

So as to fix a fragile object, such as a mirror (10) embarked on a man-made satellite, which is required to undergo significant temperature variations, as well as impacts and vibrations, two dovetail-shaped grooves are machined on this object, a pair of thin strips (20,22) being placed in each of said grooves. The thin strips are secured to a supporting block (14) by means of screws (24), a stack of spring washers being placed between the head of each screw and the block. Sheets, preferably made of malleable metal such as gold, are placed between the object (10) and each of the parts of the fixing device in contact with this object.

11 Claims, 2 Drawing Sheets

DEVICE FOR FIXING A FRAGILE OBJECT, SUCH AS MIRROR

FIELD OF THE INVENTION

The invention concerns a device making it possible to fix a fragile object, such as a mirror requiring precise positioning, whilst enabling it to withstand high temporary mechanical loads and temperature gradients.

BACKGROUND OF THE INVENTION

Such a fixing device may in particular be used on a man-made satellite so as to secure to the satellite a silica or glass mirror whose weight may be up to about 20 kg. In fact, between its conditions of use in space and on the ground, such a mirror is subjected to temperatures which may vary between −269° C. and +180° C. Moreover, it is required to withstand significant vibrations and accelerations, especially during the launching phase, without sustaining any degradations or deformations and in particular of its active surface.

Amongst the currently known devices for securing a fragile object, such as a mirror, none of these fully satisfy these various requirements.

Accordingly, the known technique, for example, consisting of glueing blocks flush with the substrate of the mirror, which does not exhibit or hardly exhibits any drawback within a range of temperatures of less than 40° C., may result in the glue film or the substrate rupturing during extremely large temperature ranges owing to the stresses generated in the substrate of the mirror by differential expansions.

SUMMARY OF THE INVENTION

The precise object of the invention is to provide a device for fixing a fragile object, such as a mirror, whose special design makes it possible to withstand such differential expansions without inducing any excess stresses generated in the substrate of the mirror by differential expansions and also to withstand any high temporary loads whilst retaining correct positioning accuracy without generating any deformations.

According to the invention, this result is obtained by means of a device for fixing a fragile object, such as a mirror, wherein it includes:
- at least one groove with a dovetail-shaped section formed in said object, said groove comprising two non-opening extremities;
- at least one pair of trapezoidal sectional thin strips suitable for being mounted in said groove so that each wooden strip is in contact with one flat lateral slanted face of the groove;
- a supporting block placed opposite said groove and bearing at least one locking member suitable for being placed between the thin strips so as to keep them in place against said lateral slanted faces;
- screws via which each of the thin strips is secured to the supporting block; and
- at least one spring washer inserted between said supporting block and the head of each screw.

In this device, the non-opening nature of the dovetail groove formed in the object to be fixed makes it possible to avoid the latter becoming embrittled at the location of the groove. The shape given to the thin strips enables them to be introduced into the groove and to extract them from said groove, whilst allowing for effective fixing when the locking member is placed between the thin strips. The spring washers associated with the screws allow for backlash elimination due to the differential expansions of the materials used whenever the temperature rises and falls, without the tightening tension of the screws varying significantly. The tightening power of the screws is adjusted so that at any time, that is especially under the effect of gravity and at the time of launching, the forces applied to the mirror are taken up by friction.

In one preferred embodiment of the invention, the locking member is constituted by a section projecting from the supporting block and having slanted flat faces forming, along with the lateral faces of the groove, two isosceles trapezoid-shaped sectional housings in which the two thin strips are placed.

So that the tightening powers of the screw are applied on as large as possible surface of the object to be fixed, each thin strip advantageously exhibits one flat face suitable for being applied against one of the lateral faces of the groove, and one convex face, for example roughly in the shape of an arc of a circle, suitable for being applied against one of the slanted flat faces of the locking member.

Preferably, the device of the invention includes two parallel grooves with the same dimensions formed in the object, a pair of thin strips being housed in each of the grooves, all the thin strips being connected to a single supporting block.

In this case, the two thin strips most inside the device are made of a first material, such as stainless steel, having a high coefficient of expansion with respect to a second material, such as invar, in which the other two thin strips and the supporting block are embodied.

In the case where the device includes two parallel grooves, the single supporting block preferably bears between the grooves a positioning slug suitable for being received with virtually no play inside a cylindrical housing formed in the object.

So as to avoid at the time of tightening peeling of the surface micro-roughnesses and accordingly the start of microcracks able to then spread until the object breaks up, a fine sheet made of a malleable material, such as gold, is preferably placed between the object and each of the sections of the device with which said object is in contact, namely the block, the thin strips and, if it exists, the positioning slug.

BRIEF DESCRIPTION OF THE DRAWINGS

One preferred embodiment of the invention is now to be described by way of non-restrictive example with reference to the accompanying drawings in which.

DETAILED DESCRIPTION OF THE PREFERRED EMBODIMENTS

The fixing device of the invention and illustrated on FIGS. 1 to 4 is intended to ensure the fixing of a mirror 10 made of a fragile material, such as silica, onto a suitable bearer structure (not shown) of a manmade satellite. The mirror 10 has the shape of a flat disk whose diameter may, for example, be close to 600 mm and whose weight may be about 20 kg.

So as to take account of the forces applied to the mirror, both on the ground (gravity) and in space (launching), which are mainly orientated along directions tangential to the mirror, the fixing of the mirror 10 is ensured by at least three fixing devices, such as the device 12, cooperating with the circumferential edge 10a of the mirror 10.

Figure 2:
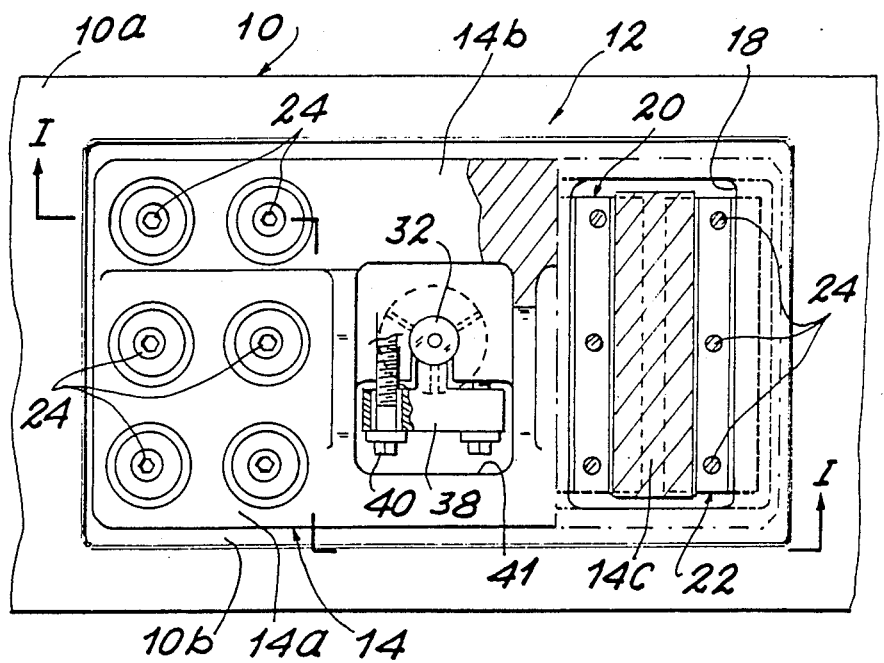
FIG. 2 is a partial cutaway top view along the line II—II of FIG. 1 of the fixing device.
Figure 3:
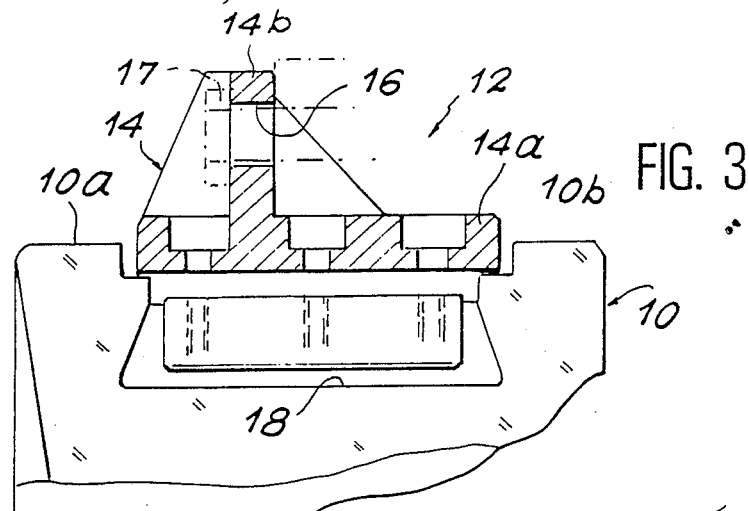
FIG. 3 is a cutaway view along the line III—III of FIG. 1 not showing the screws for fixing the thin plates on the block.

At the location of each of the fixing devices 12, this circumferential edge 10a of the mirror 10 exhibits a rectangular-shaped flat surface 10b which does not extend as far as the front and rear faces of the mirror, as shown in particular on FIGS. 2 and 3. The rectangular flat sole 14a of one supporting block 14 of the fixing device 12 is applied onto this flat surface 10b. More precisely, the rectangular sole of the block 14 has a length approximately equal to the circumferential length of the flat surface 10b and a width slightly less than the width of this flat surface.

The supporting block 14 also comprises a rib 14b which projects from the sole 14a from the side opposite the mirror 10 along a direction parallel to the faces of the latter. This rib 14b is traversed at its middle by a hole 16 orientated parallel to the axis of the mirror and allowing for fixing of the block 14 onto a supporting structure (not shown) provided for this effect on the satellite. This fixing may be effected with the aid of any suitable means, such as a bolt 17 partially represented by the dot-and-dash lines on FIG. 3.

The fixing device 12 of the invention also includes two parallel grooves 18 with a dovetail-shaped section (FIG. 1) and which are machined in the flat surface 10b along a direction parallel to the axis of the mirror 10 close to each of the circumferential extremities of this flat surface 10b. As clearly shown on FIG. 3, the grooves 18 comprise extremities which do not open onto the lateral faces of the mirror 10. This characteristic is an essential one, as it makes it possible to retain the circular shape of the mirror near to each of its faces, which avoids the formation of brittleness zones where ruptures may start to occur.

Each of the dovetail-shaped grooves 18 exhibits two lateral slanted faces 18a opposite the bottom of the groove and, along with the latter, forming an angle of close to 60°. The grooves, just like the flat surface 10b, are directly machined in the mirror 10, for example by milling.

Two thin strips 20 and 22 are placed in each of the grooves 18, said strips roughly having as a section the shape of rectangular trapezoids. The dimensions of these strips 20 and 22 are such that they may be inserted into and extracted from the corresponding groove 18 and placed side by side in this groove so that each of them is in contact with one of the lateral faces 18a, as shown on FIG. 1.

More precisely, FIGS. 1 to 4 show that each of the thin strips 20 and 22 have one slanted flat face respectively 20a and 22a suitable for taking support against the corresponding lateral face 18a of the groove 18 where these thin strips are placed.

The supporting block 14 also has, on the face of the sole 14a turned towards the mirror 10, two corner-shaped projecting sections 14c to be placed between the thin strips 20 and 22 mounted in each of the grooves 18 when the block 14 is put in place. The projecting sections 14c thus constitute locking members against which the thin strips 20 and 22 are also supported.

More precisely, each of the projecting sections 14c comprises two flat slanted surfaces 14c1 turned towards the bottom of the corresponding groove 18 and forming with the latter the same angle as the lateral slanted faces 18a. The projecting sections 14c thus delimit inside the corresponding groove 18 two sectional isosceles trapezoid housings in which each of the thin strips 20 and 22 are confined.

Figure 4:
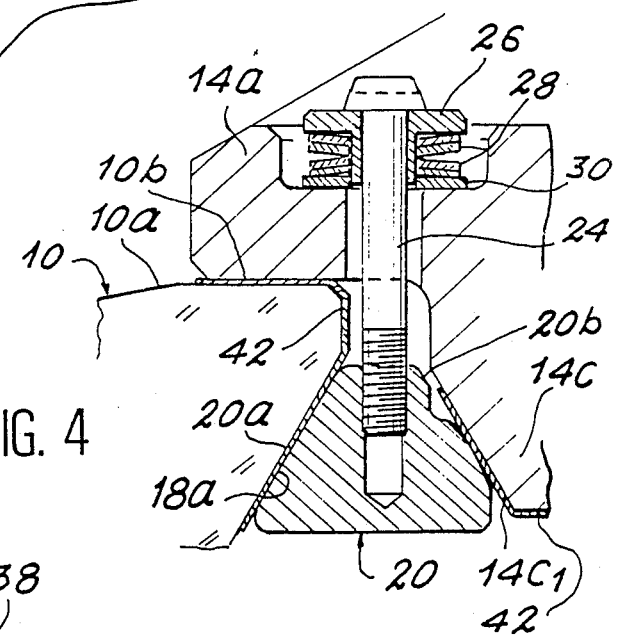
FIG. 4 is a sectional view representing on a larger scale the fixing of one of the thin plates of the device onto the block.

So as to guarantee a satisfactory contact between the flat slanted faces 20a and 22a of the thin strips and the flat lateral faces 18a of the grooves, the faces 20b and 22b of the thin strips 20 and 22, which are in contact with the slanted faces 14c1 of the projecting sections 14c, have a complex shaped section, this section being an arc of a circle-shaped section (FIG. 4). One hollow section may also be provided on these faces 20b and 22b in order to in particular lighten the thin strips.

Figure 1:
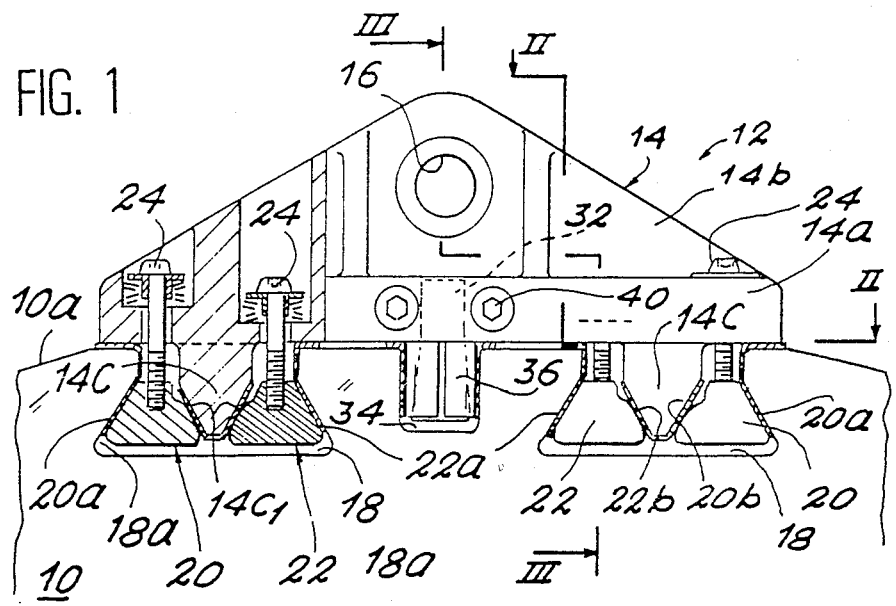
FIG. 1 is a partial cutaway front view along the line I—I of FIG. 2 and represents a fixing device according to the invention.

As shown on FIGS. 1 and 2, each of the thin strips 20 and 22 is secured to the sole of the block 14 by means of screws 24, for example three for each of the thin strips. These screws 24 freely traverse the sole of the block 14 and their extremity is screwed into the corresponding thin strip.

As shown in more detail on FIG. 4, the head of each screw 24 is in support by means of a support plugwasher 26 on a stack of spring washers, such as Belleville washers 28. The Belleville washers 28 are themselves in support on the bottom of a countersinking formed on the outer face of the sole 14a of the block 14 by means of a washer 30.

When the screws 24 are screwed into the thin strips 20 and 22, the latter are clad with a specific force against the lateral faces 18a of the grooves 18 and against the slanted faces 14c1 of the projecting sections 14c of the block. The force thus applied through the screws 24 is determined so that fixing of the mirror 10 is able to withstand the accelerations and vibrations the satellite is subjected to, especially during the launching phase.

The insertion of spring washers 28 between the screws 24 and the block 14 makes it possible to compensate for the differential expansions which occur between the various materials when the device is subjected to significant temperature variations. Moreover, the characteristics of the spring washers, despite this backlash elimination, make it possible to keep the chucking power applied to the thin strips at a relatively constant value.

Preferably, the block 14, as well as the thin strips 20 situated outside the device, are made of a material, such as invar, having an extremely low coefficient of expansion. On the other hand, the thin strips 22 situated inside the device are made of a material, such as stainless steel, having a higher coefficient of expansion. This choice of materials makes it possible to obtain a simultaneous displacement with a similar value of the thin strips 20 and 22, either towards the block 14 when the temperature drops, or by moving them away from this block in the event of the temperature rising. It should be mentioned that the angles of inclination of the lateral faces 18a of the grooves (close to 60°) are optimized so as to allow for this relative displacement.

In the embodiment shown on the figures, the case has been illustrated of a fixing device 12 making it possible to maintain an extremely precise positioning of the mirror 10 where said mirror is subjected to thermal cycles. So as to ensure this positioning and as illustrated in more detail on FIG. 5, the sole 14a of the block 14 bears at its center a positioning slug 32 which projects into a cylindrical housing 34 machined at the center of the flat surface 10b of the mirror between the two grooves 18.

The section of the slug 32 situated inside the cylindrical housing 34 has a truncated shape and its diameter increases further as it approaches the bottom of the housing. A split ring 36 formed, for example, of three circular sectors, is housed between this truncated section of the slug 32 and the cylindrical wall of the housing 34. The split ring 36 has a lower truncated surface complementary to that of the truncated section of the slug 32 and an external cylindrical surface. As a result, when the slug 32 is moved towards the block 14, the ring 36 is clad against the cylindrical wall of the housing 34. Such a tractive force may in particular be applied to the positioning slug 32 by a screw (not shown) taking support on the upper face of the sole 14a of the block 14 and screwed into a threaded hole 32a formed for this purpose in the slug 32.

Figure 5:
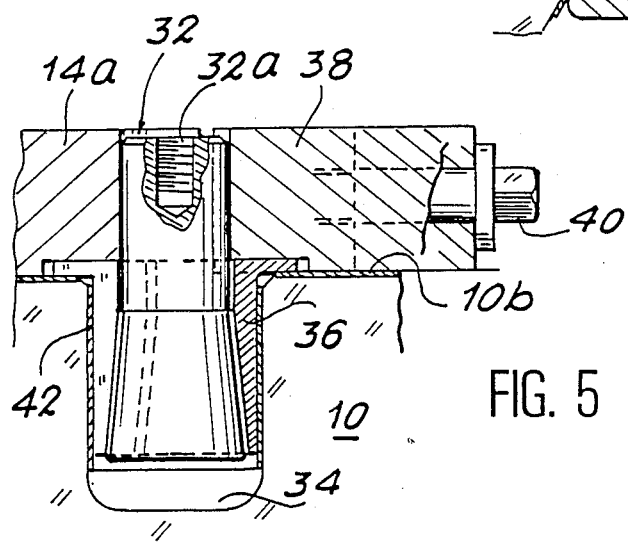
FIG. 5 is a sectional view representing on a larger scale the slug enabling the block to be positioned on the mirror.

When the position of the slug 32 corresponds to a satisfactory cladding of the ring 36 against the cylindrical wall of the housing 34, a blocking part 38, shown on FIGS. 2 and 5, is fixed into the sole of the block 14, for example by means of screws 40. As shown on FIG. 2, this blocking part 38 is placed inside a recess 41 formed for this purpose in the sole 14a of the block 14 and comprises a projecting section whose extremity comes to take support on one side of the slug so as to block it in the sole.

A fine sheet 42, made of a malleable material such as annealed fine gold, is preferably inserted between the mirror 10 and each of the parts in contact with the latter. Thus, a sheet of gold is placed between the sole 14c of the block and the flat surface 10b formed on the mirror between the lateral faces 18a of the grooves and the faces 20a and 22a of the thin strips and between the sectors 36 and the cylindrical recess 34.

As shown in particular on FIGS. 1 and 4, a sheet of gold 42 may also be placed between each of the projecting sections 14c of the block 14 and the thin strips 20 and 22.

These various sheets of gold 42 make it possible to avoid superficial micro-roughnesses of the mirror during clamping by distributing the chucking power over all the surfaces in contact. In this way, it is possible to prevent microcracks from starting which could then spread and result in the mirror breaking.

The fixing device 12 described above makes it possible to withstand, without damage occuring, temperature variations of between −269° C. and +180° C. Furthermore, it withstands temporary loads possibly in excess of 20 g with a positioning precision of several microns when the mirror is used. Finally, the deformations of the active surface of the mirror are less than 0.1 microns.

Of course, the invention is not merely restricted to the embodiment described above given by way of example, but also can be extended to all variants.

In the first place, one can readily understand that the fixing device of the invention may be used to fix fragile objects other than mirrors and whose shape may be different. The location of the fixing device may also differ from the location described above.

In addition, in certain applications, the centering slug may be suppressed.

When the forces and impacts borne by the object are less significant, a single groove, similar to the grooves 18, may be embodied in the object. The two thin strips received in this groove, as well as the block to which they are secured, are then made of a given material, such as invar, having a low coefficient of expansion.

The shape of the thin strips may also differ from the one described earlier, especially as regards their faces turned towards the locking member 14c, the latter also able to be embodied separately from the block 14 and placed after the latter.

What is claimed is:
1. Device for fixing a fragile object, such as a mirror, and comprising:
  at least one sectional dovetail-shaped groove formed in said object, said groove comprising two non-opening extremities;
  at least one pair of thin strips with a trapezoidal section suitable for being mounted into said groove so that each thin strip is in contact with one flat lateral slanted face of the groove;
  a supporting block placed opposite said groove and bearing at least one locking member suitable for being placed between the thin strips so as to keep them against said slanted lateral faces;
  screws screwing each of the thin strips to the supporting block; and
  at least one spring washer inserted between said supporting block and the head of each screw.
2. Device according to claim 1, wherein said locking member is constituted by one section projecting from the supporting block and having slanted flat faces forming, along with the lateral faces of the groove, two housings with an rectangular isosceles section, the two thin strips being placed in said housings.
3. Device according to claim 2, wherein each thin strip has one flat face suitable for being applied against one of the lateral faces of the groove, and one convex face suitable for being applied against one of the slanted flat faces of the locking member.
4. Device according to claim 1, wherein a sheet made of a malleable material is placed between the object and the block and between the object and the thin strips.
5. Device according to claim 1, wherein a sheet made of a malleable material is placed between the locking member and the thin strips.
6. Device according to claim 1, wherein two parallel grooves of the same dimensions are formed in said object, one pair of thin strips being housed in each of the grooves, all the thin strips being connected to a single supporting block.
7. Device according to claim 6, wherein the two thin strips most inside the device are made of a first material having a coefficient of expansion higher than a second material in which the two other thin strips and the supporting block are embodied.
8. Device according to claim 7, wherein the first material is stainless steel and the second material is invar.
9. Device according to claim 6, wherein the single supporting block bears between the grooves a positioning slug suitable for being received with virtually no play in a cylindrical housing formed in said object.
10. Device according to claim 9, wherein a sheet made of a malleable material is placed between the object and the positioning slug.
11. Device according to any one of claims 4, 5 and 10, wherein said malleable material is gold.

* * * * *